(12) United States Patent
Broumas et al.

(10) Patent No.: US 9,787,648 B2
(45) Date of Patent: Oct. 10, 2017

(54) SYSTEM AND METHOD FOR TRUSTZONE ATTESTED AUTHENTICATORS

(71) Applicant: Samsung Electronics Co., Ltd., Suwon-si, Gyeonggi-do (KR)

(72) Inventors: Antonios Dimitrios Broumas, Oakland, CA (US); Pai Peng, Sunnyvale, CA (US); Geng Chen, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/596,040

(22) Filed: Jan. 13, 2015

(65) Prior Publication Data

US 2015/0381369 A1 Dec. 31, 2015

Related U.S. Application Data

(60) Provisional application No. 62/016,865, filed on Jun. 25, 2014.

(51) Int. Cl.
*H04L 9/32* (2006.01)
*H04L 29/06* (2006.01)

(52) U.S. Cl.
CPC ........ *H04L 63/0428* (2013.01); *H04L 9/3228* (2013.01); *H04L 9/3263* (2013.01); *H04L 63/08* (2013.01)

(58) Field of Classification Search
CPC .................................................. H04L 2209/56
USPC ........................................................ 713/176
See application file for complete search history.

(56) References Cited

U.S. PATENT DOCUMENTS

| | | | | |
|---|---|---|---|---|
| 6,595,342 B1* | 7/2003 | Maritzen | ............... | G06Q 20/02 194/212 |
| 7,188,110 B1* | 3/2007 | Ludtke | ................ | G06Q 20/341 382/115 |
| 2002/0038348 A1* | 3/2002 | Malone | ............ | G06F 17/30864 709/217 |
| 2010/0325427 A1* | 12/2010 | Ekberg | .................... | H04L 9/321 713/156 |
| 2012/0158584 A1* | 6/2012 | Behren | .................. | G06Q 20/10 705/41 |
| 2012/0158654 A1* | 6/2012 | Behren | .............. | G06Q 20/0453 707/626 |
| 2012/0166333 A1* | 6/2012 | von Behren | ........... | G06Q 20/10 705/41 |
| 2012/0259734 A1* | 10/2012 | Bishop | ................. | G06Q 20/341 705/26.41 |
| 2012/0317661 A1* | 12/2012 | Yamaguchi | ........... | H04L 9/0825 726/32 |

* cited by examiner

*Primary Examiner* — Teshome Hailu

(57) ABSTRACT

A method includes receiving a challenge from an authentication consumer. The method also includes generating for display a figure associated with an identification, a public certificate, and a private key after receiving the challenge. The figure, the identification, the public certificate, and the private key are stored in a TrustZone (TZ) enriched environment. The method further includes receiving an input identification. The method includes verifying that the input identification matches the identification. The method also includes transmitting the challenge to the authentication consumer in response to verifying that the input identification matches the identification.

20 Claims, 6 Drawing Sheets

SYSTEM AND METHOD FOR TRUSTZONE ATTESTED AUTHENTICATORS

TECHNICAL FIELD

The present application relates generally to handsets and, more specifically, to handset authentication.

BACKGROUND

With mobile applications, an entity residing outside of a mobile device, such as a web service, may require the authentication of the user who possesses the device. The communication between an authentication consumer and a mobile device user must be trusted by both parties. It should be impossible, with such authentication, to modify the transferred data without such modification being detected by both parties. The mobile device user should easily know that an authentication request came from a bona-fide partner and not a rogue application. The authentication consumer must be assured that the authentication came from a specific device and was vetted by the user.

SUMMARY

In a first embodiment, a method is provided. The method includes receiving information and a challenge from an authentication consumer server. The method also includes generating utilizing a secure display to present the information received from the server. The method further includes receiving trusted input associated with the authentication consumer server. The method includes generating a signing public-private key pair. The method also includes transmitting the public portion of the signing key, the signed challenge, and an additional signed response to the authentication consumer server.

In a second embodiment, an apparatus is provided. The apparatus includes a TrustZone (TZ) enriched environment. The TZ enriched environment includes a TZ database. The TZ database is configured to store a figure, an identifying input, and a signed public-private key pair. The TZ enriched environment also includes a TZ user interface. The TZ user interface is configured to receive a challenge from an authentication consumer server. The TZ user interface is also configured to generate for display server information to an authenticating user. The TZ user interface is further configured to receive an trusted input from the authentication consumer server. The TZ enriched environment further includes a TZ authentication unit. The TZ authentication unit is configured to process the challenge after receiving proper trusted input and transmit a signed response message to the authentication consumer server.

In a third embodiment, a system is provided. The system includes a server associated with an authentication consumer. The server is configured to transmit a request for a transaction associated with an account. The server is also configured to receive an input and a signed public key from an apparatus associated with the account. The server is further configured to send a challenge and a transaction request. The server is configured to receive a signed response containing verification and an authorization to complete the transaction matching the submitted challenge and transaction request. The system also includes an apparatus. The apparatus includes a TZ enriched environment. The TZ enriched environment includes a TZ database. The TZ database is configured to store a figure, information identifying a user account holder, and a sign public key. The TZ enriched environment also includes a TZ user interface and a secure two-way path to an authenticator. The TZ user interface is configured to receive a challenge and transaction information from the server. The TZ user interface is also configured to generate for display securely server transaction information. The TZ user interface is further configured to receive secure input from the authenticator identifying the user account holder. The TZ enriched environment further includes a TZ authentication unit. The TZ authentication unit is configured to process the challenge after receiving a proper trusted input and a transaction response. The TZ enriched environment is also configured to transmit a signed verified authorization or rejecting message to the authentication consumer server.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
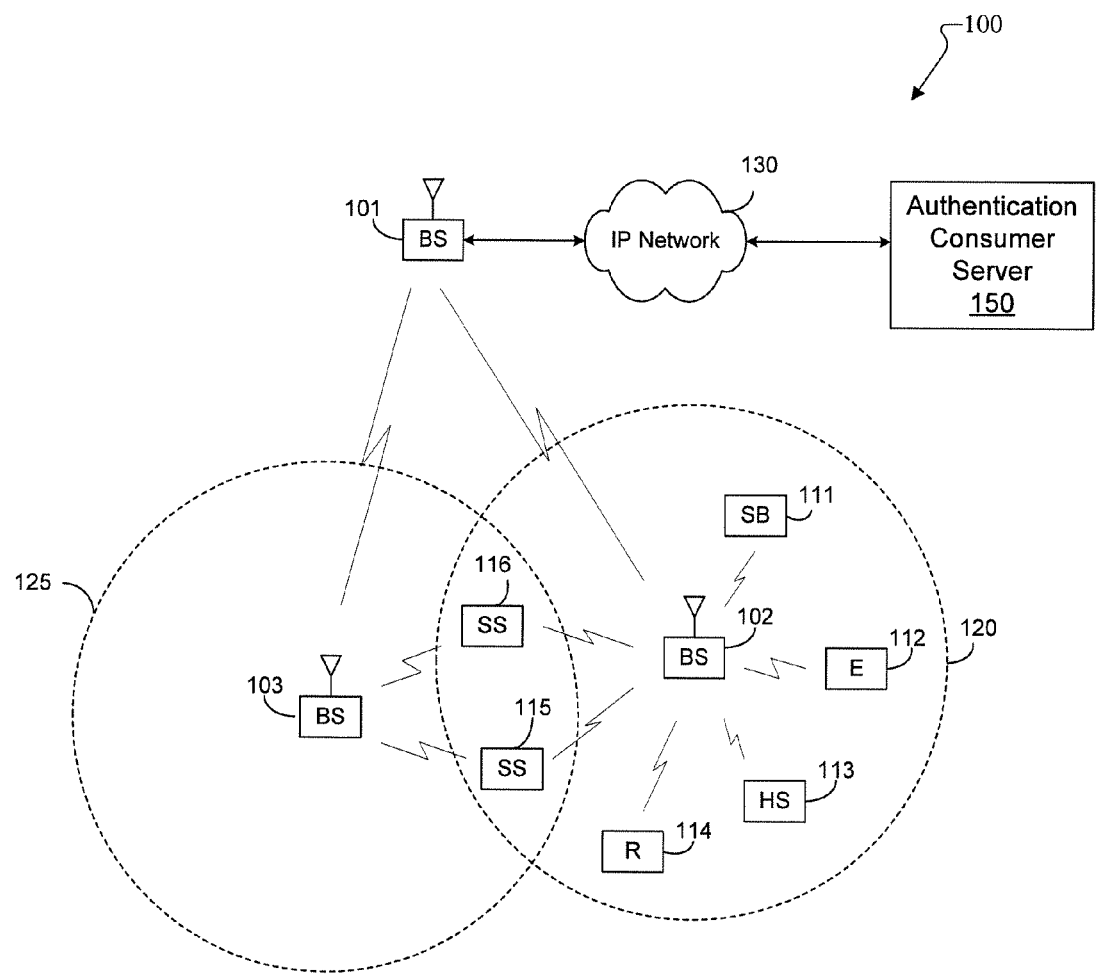
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As shown in FIG. 1, the wireless communication system 100 also includes an authentication consumer server 150. The authentication consumer server 150 is configured to communicate with a UE, such as UE 116, via the IP network 130 and BS 101. The authentication consumer server 150 can be associated with a banking entity or any other entity that requires or uses a secure transaction verification system. The authentication consumer server 150 is a previously authenticated entity that is authenticated for communicating with a TrustZone (TZ) enriched environment located in a memory of the UE 116 that receives an indication of a transaction associated with an account. After receiving the indication of the transaction, the authentication consumer server 150 identifies one or more UEs associated with the account. The authentication consumer server 150 generates and transmits a challenge to be received by the UEs for secured verification by the respective UEs as will be discussed further herein. The challenge can include an approval of a transaction (such as a financial transaction) associated with the account. After transmitting the challenge to the UEs, the authentication consumer server 150 receives the challenge and an authorization to complete the transaction after transmitting the challenge. Based on receiving the challenge and the authorization to complete the transaction, the authentication consumer server 150 can approve the transaction associated with the account.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
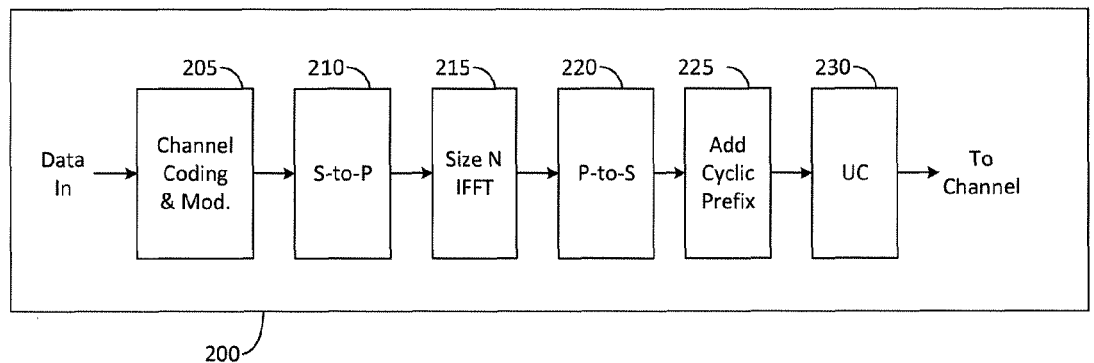
FIGS. 2A and 2B illustrate example wireless transmit and receive paths according to this disclosure.
Figure 2B:
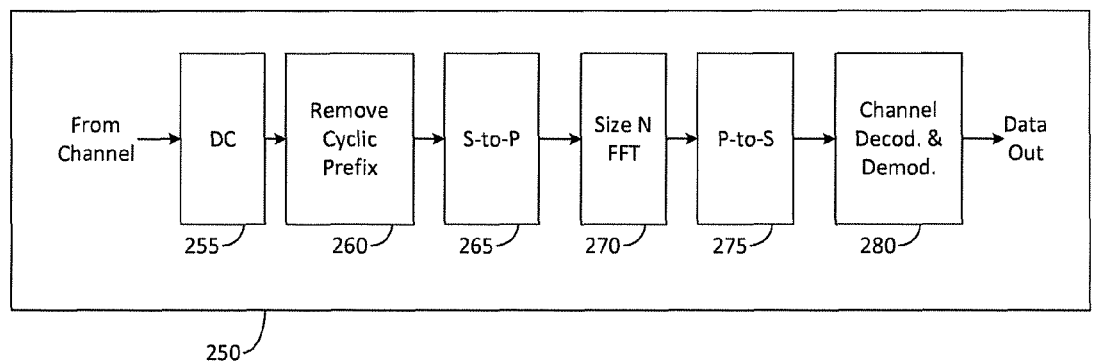

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to carry or transport challenge questions to a UE and challenge answers from the UE.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
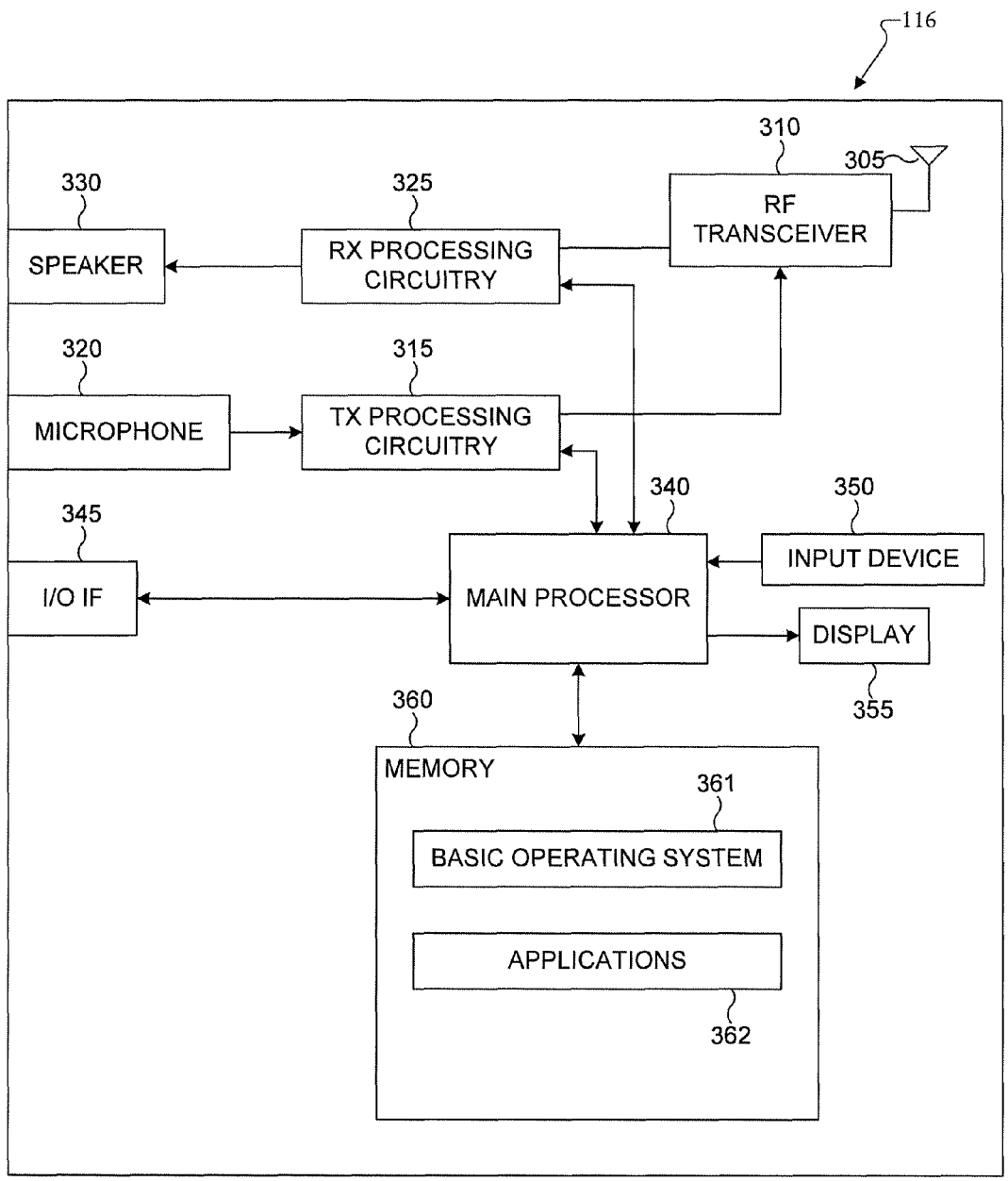
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, an input device 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, and particularly in the TZ as further discussed herein, such as operations for associating or linking an input with a figure, associating or linking a public certificate and private key with the figure, receiving a challenge and transaction information.

The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the input device 350 and the display unit 355. The operator of the UE 116 can use the input device 350 to enter data into the UE 116. The display 355 may be a liquid crystal display or other display capable of rendering text and/or at least limited graphics, such as from web sites. The input device 350 includes at least one of a keyboard, a finger print scan, a retinal scan, an electronic touch surface (such as a touch screen), and a biometric sensor.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
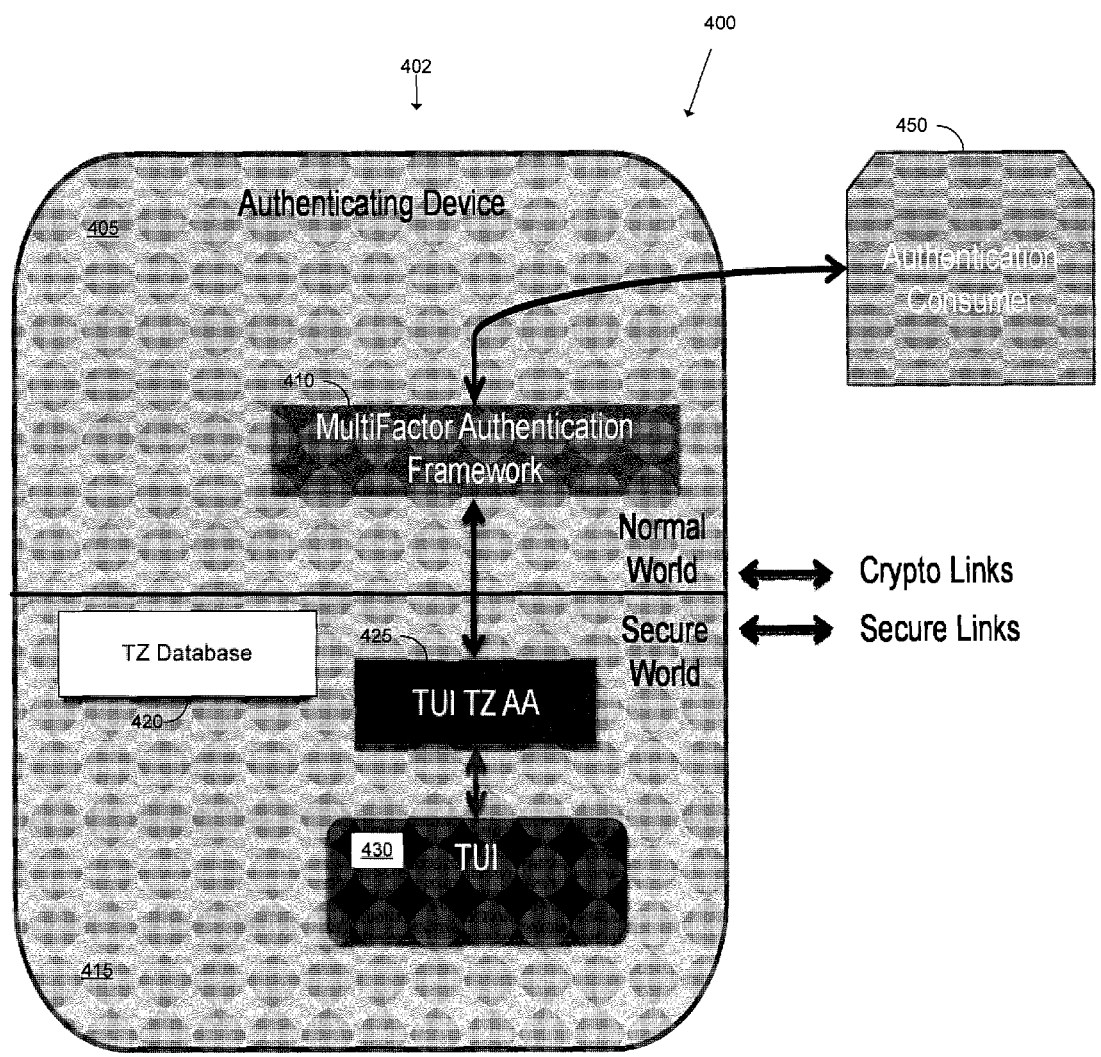
FIG. 4 illustrates an example attested authentication system according to this disclosure.

FIG. 4 illustrates an example attested authentication system 400 according to this disclosure. The embodiment of the attested authentication system 400 illustrated in FIG. 4 is for illustration only. Other embodiments could be used without departing from the scope of the present disclosure.

The attested authentication system 400 includes an authentication consumer server 450, and an authenticating device (AD) 402. The AD 402 includes a non TZ environment 405 including a multifactor authentication framework (MFAF) 410, and a TZ environment 415 including a TZ database 420, a TZ authentication unit 425, and a TZ user interface 430.

In certain embodiments, the AD 402 is integrated with the memory 360 or one or more other components of the UE 116. In certain embodiments, the AD 402 is a component of the memory 360 or one or more other components of a UE 116. As previously stated the AD 402 includes a non TZ environment 405 and a TZ environment 415. The non TZ environment includes an MFAF 410. The MFAF 410 is a proxy unit that allows for communication between the non TZ environment 405 and the TZ environment 415. The TZ authentication unit 425 is configured to facilitate interaction between the TZ database 420, the TZ user interface 430, and the non TZ environment 405.

The TZ environment 415 includes a TZ user interface 430. The TZ user interface 430 is used to facilitate both an enrollment phase and an authentication phase. In the enrollment phase, the TZ user interface 430 can be initiated, for example, when the UE 116 receives an enrollment request from the authentication consumer server 450. The UE 116 can also transmit a request to the authentication consumer server 450 for the authentication consumer server 450 to transmit the enrollment request to the UE 116. After receiving the enrollment request from the authentication consumer server 450, the authentication device 402 receives an input via the TZ user interface 430. The input includes an agreement between the authenticating device 402 and an entity providing the input, such as a user. The input includes a code such as an alpha-numeric code or the like. The agreement includes a photograph or picture. The authentication device 402 associates the photograph and the code with the authentication consumer server 450. After receiving the agreement, the authentication device 402 creates a random key pair such as private key and a public key. The authentication device 402 signs the public key using a secret root key determined by the manufacturer of the authentication device 402 and stored in the TZ database 420. The authentication device 402 transmits an enrollment message to the authentication consumer server 450. The enrollment message includes a copy of the public key to the authentication consumer server 450. The authentication device 402 retains the public key and the private key in the TZ database 420.

As previously discussed, the TZ user interface 430 is also used to facilitate an authentication phase. For example, after the authentication consumer server 450 (which can be similar to, or the same as, the authentication consumer server 150 illustrated in FIG. 1) receives the enrollment message, the authentication consumer server 450 transmits an authentication request message or challenge to the authentication device 402. After the authentication device 402 receives the challenge, the trusted user interface 430 presents or displays the authentication request message in a secured way. For example, after the authentication device 402 receives the challenge, the trusted user interface 430 presents or displays a message requesting a verification of a transaction at the authentication consumer or authentication consumer server 450 and a secured photograph. After presenting or displaying the message, the trusted user interface 430 receives an input such as a secret code (such the previously discussed code or previously discussed alpha-numeric code) previously provided during the enrollment phase.

Upon receiving the input, the TZ user interface 430 transmits the input to the TZ authentication unit 425. The TZ authentication unit 425 accesses the TZ database and attaches a public key signed by the secret root key with the input. The public key signed by the secret root key was previously provided to the authentication consumer server 450 during the enrollment phase. Upon attaching the input with the signed public key, the TZ authentication unit 425 transmits both the input and the public key signed by the secret root key with the challenge to the authentication consumer server 450 to provide confirm authorization to approve the completion of a transaction.

Once the authentication consumer server 450 receives the challenge from the TZ user interface 430, the authentication consumer server 450 examines the input and the public key signed by the secret root key to verify that the challenge received from the TZ user interface 430 has the same input and signed public key as the input and signed public key previously received by the authentication consumer server 450 from the TZ user interface 430 during the enrollment phase. If the authentication consumer server 450 determines that the received challenge is the same challenge previously transmitted to the authentication device 402 and the input and signed public key are the same input and signed public key provided to the authentication consumer server 450 during the enrollment phase, the authentication consumer server 450 identifies that the approval to complete the transaction is authorized. In certain embodiments, the authorization consumer server 450 does not approve the completion of the transaction when the authorization consumer server 450 receives at least one of an unrecognizable input, challenge, or signed public key. In certain embodiments, the authorization consumer server 450 identifies that the transaction is not approved by receiving an affirmative indication that the transaction is not approved along with the input, challenge, and signed public key. In certain embodiments, the authorization consumer server 450 identifies that the transaction is not approved if the authentication consumer server 450 does not receive the challenge after sending the challenge within a predetermined time period.

Figure 5:
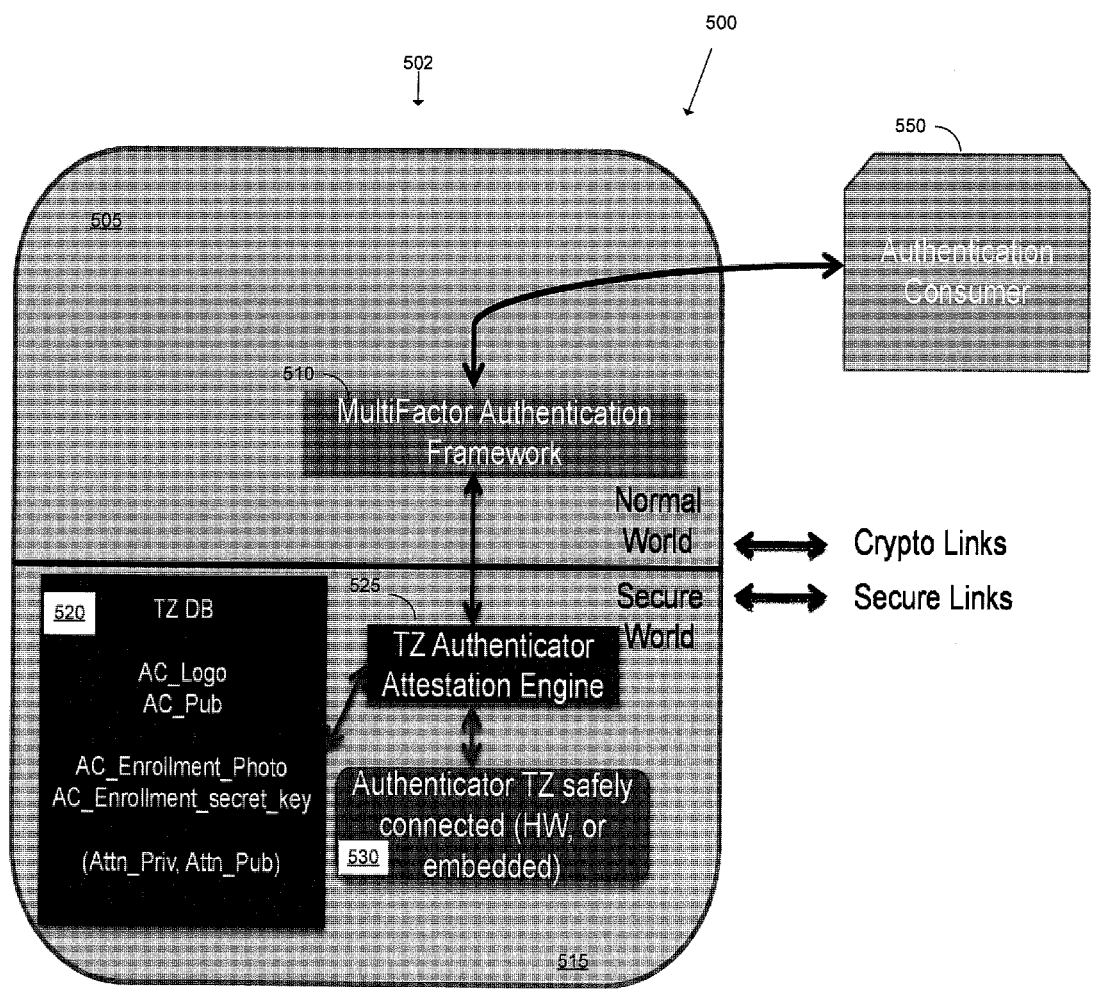
FIG. 5 illustrates another example attested authentication system according to this disclosure.

FIG. 5 illustrates an example attested authentication system 500 according to this disclosure. The embodiment of the attested authentication system 500 illustrated in FIG. 5 is for illustration only. Other embodiments could be used without departing from the scope of the present disclosure.

The attested authentication system 500 includes an authentication consumer server 550, and an authenticating device (AD) 502. The AD 502 includes a non TZ environment 505 including a multifactor authentication framework (MFAF) 510, and a TZ environment 515 including a TZ database 520, a TZ authentication unit 525, and a TZ securely connected authenticator 530.

In certain embodiments, the AD 502 is integrated with the memory 360 or one or more other components of the UE 116. In certain embodiments, the AD 502 is a component of the memory 360 or one or more other components of a UE 116. As previously stated the AD 502 includes a non TZ environment 505 and a TZ environment 515. The non TZ environment includes an MFAF 510. The MFAF 510 is a proxy unit that allows for communication between the non TZ environment 505 and the TZ environment 515. The TZ authentication unit 525 is configured to facilitate interaction between the TZ database 520, the TZ securely connected authenticator 530, and the non TZ environment 505.

The TZ environment 515 includes a TZ securely connected authenticator 530. The TZ securely connected authenticator 530 is used to facilitate both an enrollment phase and an authentication phase. In the enrollment phase, the TZ securely connected authenticator 530 can be initiated, for example, when the UE 116 receives an enrollment request from the authentication consumer server 550. The UE 116 can also transmit a request to the authentication consumer server 550 for the authentication consumer server 550 to transmit the enrollment request to the UE 116. After receiving the enrollment request from the authentication consumer server 550, the authentication device 502 receives an input via the TZ securely connected authenticator 530. The input includes an agreement between the authenticating device 502 and an entity providing the input, such as a user. The input includes a password, a voice command, a voice signature, a handwritten signature, a finger print, a retinal signature, a biometric signature, and the like, or a combination thereof. The input can be provided through the input device 350 illustrated in FIG. 3. The input can be digitally recorded and saved in the TZ database 520. The agreement also includes a photograph or picture. The authentication device 502 associates the photograph and the code with the authentication consumer server 550. After receiving the agreement, the authentication device 502 creates a random key pair such as private key and a public key. The authentication device 502 signs the public key using a secret root key determined by the manufacturer of the authentication device 502 and stored in the TZ database 520. The authentication device 502 transmits an enrollment message to the authentication consumer server 550. The enrollment message includes a copy of the public key to the authentication consumer server 550. The authentication device 502 retains the public key and the private key in the TZ database 520.

As previously discussed, the TZ securely connected authenticator 530 is also used to facilitate an authentication phase. For example, after the authentication consumer server 550 (which can be similar to, or the same as, the authentication consumer server 150 illustrated in FIG. 1) receives the enrollment message, the authentication consumer server 550 transmits an authentication request message or challenge to the authentication device 502. After the authentication device 502 receives the challenge, the trusted user interface 530 presents or displays the authentication request message in a secured way. For example, after the authentication device 502 receives the challenge, the trusted user interface 530 presents or displays a message requesting a verification of a transaction at the authentication consumer or authentication consumer server 550 and a secured photograph. After presenting or displaying the message, the trusted user interface 530 receives an input such as a secret code (such the previously discussed code or previously discussed alpha-numeric code) previously provided during the enrollment phase.

Upon receiving the input, the TZ securely connected authenticator 530 transmits the input to the TZ authentication unit 525. The TZ authentication unit 525 accesses the TZ database and attaches a public key signed by the secret root key with the input. The public key signed by the secret root key was previously provided to the authentication consumer server 550 during the enrollment phase. Upon attaching the input with the signed public key, the TZ authentication unit 525 transmits both the input and the public key signed by the secret root key with the challenge to the authentication consumer server 550 to provide confirm authorization to approve the completion of a transaction.

Once the authentication consumer server 550 receives the challenge from the TZ securely connected authenticator 530, the authentication consumer server 550 examines the input and the public key signed by the secret root key to verify that the challenge received from the TZ securely connected authenticator 530 has the same input and signed public key as the input and signed public key previously received by the authentication consumer server 550 from the TZ securely connected authenticator 530 during the enrollment phase. If the authentication consumer server 550 determines that the received challenge is the same challenge previously transmitted to the authentication device 502 and the input and signed public key are the same input and signed public key provided to the authentication consumer server 550 during the enrollment phase, the authentication consumer server 550 identifies that the approval to complete the transaction is authorized. In certain embodiments, the authorization consumer server 550 does not approve the completion of the transaction when the authorization consumer server 550 receives at least one of an unrecognizable input, challenge, or signed public key. In certain embodiments, the authorization consumer server 550 identifies that the transaction is not approved by receiving an affirmative indication that the transaction is not approved along with the input, challenge, and signed public key. In certain embodiments, the authorization consumer server 550 identifies that the transaction is not approved if the authentication consumer server 550 does not receive the challenge after sending the challenge within a predetermined time period.

Figure 6:
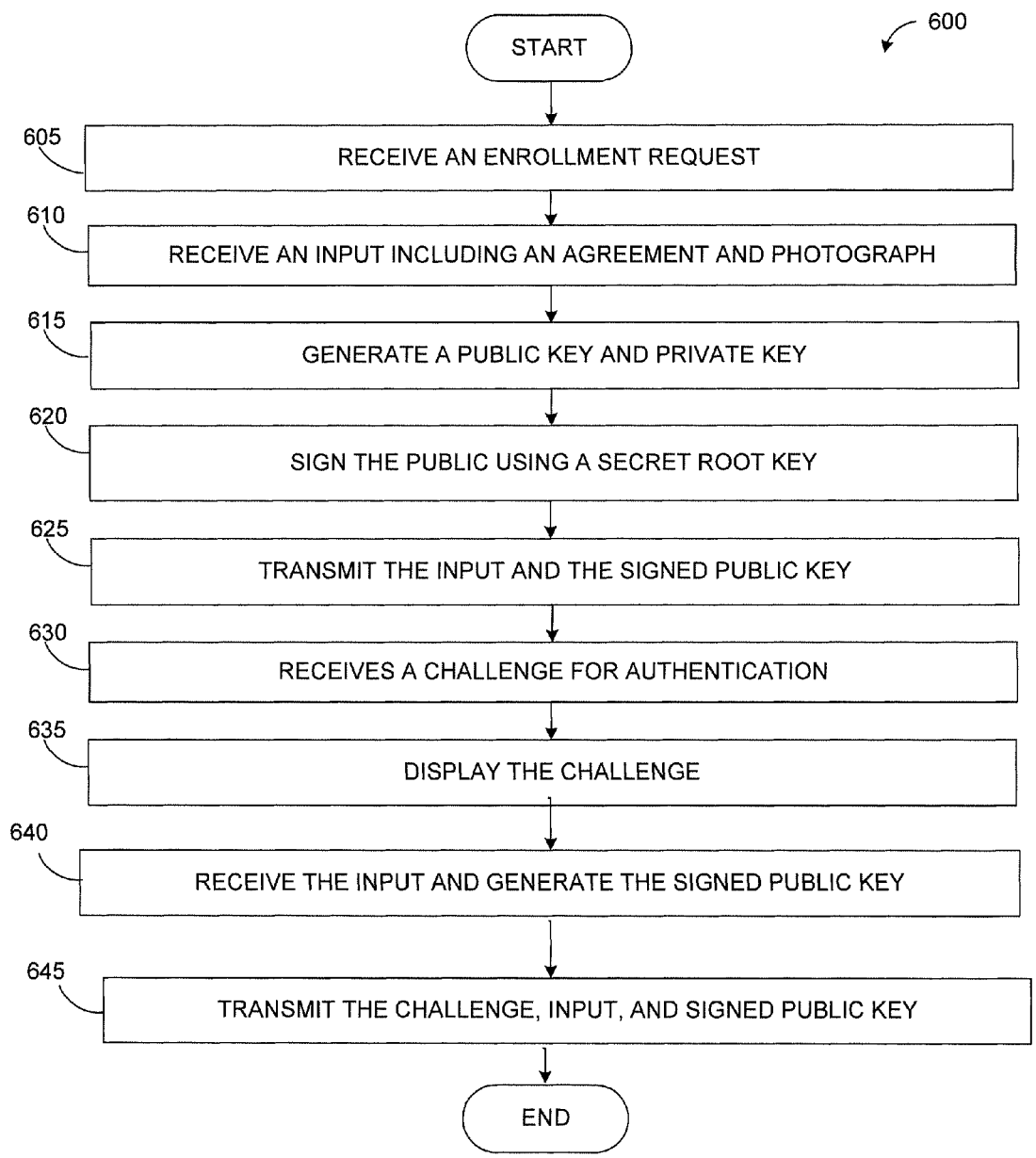
FIG. 6 is a flow diagram illustrating an example method according to this disclosure.

FIG. 6 illustrates an example method 600 according to this disclosure. The embodiment of the method 600 illustrated in FIG. 6 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station or a base station.

At step 605, the TZ user interface of a UE with a TZ enriched environment receives and receives an enrollment request from an authentication consumer server. At step 610, the TZ user interface 430 receives an input including an agreement and photograph. The input includes at least one of a password, a voice command, a voice signature, a hand-written signature, a finger print, a retinal signature, a biometric signature, a combination thereof, or the like.

At step 615, the TZ authentication unit 425 generates a key pair including a public key and a private key. At step 620, the TZ authentication unit 425 signs the public key using a secret root key stored in the TZ enriched environment. At step 625, the TZ authentication unit 425 transmits the input and the signed public key to the authentication consumer server. At step 630, the TZ authentication unit 425 receives a challenge for authentication. At step 635, the TZ user interface 430 displays the challenge. At step 640, the TZ user interface 430 receives the input and generates the signed public key. At step 645, the TZ authentication unit 425 transmits the challenge, the input, and the signed public key to the authentication consumer.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
receiving a selection of a figure and an input, storing the figure and input in a TrustZone (TZ) enriched environment, and associating the figure and the input with an authentication consumer server;
receiving, by at least one processor operating in the TZ enriched environment, a challenge from an authentication consumer server;
generating for display the challenge in a secured manner, wherein the secured manner comprises displaying the challenge in conjunction with the figure;
receiving an input associated with the authentication consumer server;
generating a signed public key using a secret root key determined by a component manufacturer and stored in a TZ database in the TZ enriched environment; and
transmitting, to the authentication consumer server, the challenge, the signed public key, and the input to the authentication consumer server, wherein the transmitted challenge matches the received challenge.

2. The method of claim 1, wherein the figure comprises a photograph.

3. The method of claim 1, further comprising associating a certificate with the authentication consumer server.

4. The method of claim 1, wherein the input comprises at least one of a password, signature, finger print, retinal signature, or biometric signature.

5. The method of claim 1, wherein the challenge comprises an indication of a transaction identified by the authentication consumer server.

6. The method of claim 5, wherein generating for display the challenge comprises generating for display an indication of the transaction identified by the authentication consumer server.

7. The method of claim 5, wherein receiving the input comprises receiving an authorization to complete the transaction identified by the authentication consumer server.

8. The method of claim 5, wherein transmitting the challenge comprises transmitting the authorization to complete the transaction with the input and the signed public key.

9. An apparatus, comprising:
at least one processor operating in a TrustZone (TZ) enriched environment, the TZ enriched environment comprising a TZ database configured to store a figure, an input, and a signed public key, the at least one processor configured to:
receive a challenge from an authentication consumer server,
generate for display the challenge in a secured manner, wherein the secured manner comprises displaying the challenge in conjunction with the figure,
receive an input associated with the authentication consumer server, and
generate the signed public key using a secret root key determined by a component manufacturer and stored in the TZ database, and
control the apparatus to transmit, to the authentication consumer server, the challenge, the signed public key, the input to the authentication consumer server, wherein the transmitted challenge matches the received challenge.

10. The apparatus of claim 9, wherein the at least one processor is configured to receive a selection of the figure and the input, store the figure and input in the TZ database, and associate the figure and the input with the authentication consumer server.

11. The apparatus of claim 10, wherein the figure comprises a photograph.

12. The apparatus of claim 9, wherein the input comprises at least one of a password, signature, finger print, retinal signature, or biometric signature.

13. The apparatus of claim 9, wherein the challenge comprises an indication of a transaction.

14. The apparatus of claim 13, wherein the at least one processor is configured to generate for display an indication of the transaction when generating for display the challenge.

15. The apparatus of claim 13, wherein the at least one processor is configured to receive an authorization to complete the transaction when receiving the input.

16. The apparatus of claim 13, wherein the at least one processor is configured to transmit an authorization to complete the transaction, the signed public key, and the input when transmitting the challenge.

17. A system, comprising:
an apparatus configured to wirelessly communicate with a server associated with an authentication consumer, the apparatus comprising at least one processor operating in a TrustZone (TZ) enriched environment, the TZ enriched environment comprising a TZ database configured to store a figure, an input, and a signed public key, the at least one processor configured to:
receive a challenge from the server, the challenge associated with a transaction,
generate for display the challenge in a secured manner, wherein the secured manner comprises displaying the challenge in conjunction with the figure,
receive an input associated with the server, generate the signed public key using a secret root key determined by a component manufacturer and stored in the TZ database, control the apparatus to transmit the signed public key, the input to the server to complete the transaction, and the received challenge for comparison with a challenge previously transmitted by the authentication consumer server.

18. The system of claim 17, wherein the at least one processor is configured to receive a selection of the figure and the input, store the figure and input in the TZ database, and associate the figure and the input with the server.

19. The system of claim 18, wherein the figure comprises a photograph.

20. The system of claim 17, wherein the input comprises at least one of a password, signature, finger print, retinal signature, or biometric signature.

* * * * *